United States Patent
Oh et al.

(10) Patent No.: US 8,340,539 B2
(45) Date of Patent: Dec. 25, 2012

(54) CONSTANT CURRENT-TYPE HIGH-VOLTAGE POWER SUPPLY APPARATUS AND METHOD OF CONTROLLING POWER OUTPUT FROM THE SAME

(75) Inventors: Chul-woo Oh, Suwon-si (KR); Jong-hwa Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 12/694,390

(22) Filed: Jan. 27, 2010

(65) Prior Publication Data

US 2011/0038645 A1 Feb. 17, 2011

(30) Foreign Application Priority Data

Aug. 17, 2009 (KR) .................... 10-2009-0075738

(51) Int. Cl.
G03G 15/00 (2006.01)
(52) U.S. Cl. .......................................... 399/37
(58) Field of Classification Search .............. 399/37, 399/78

See application file for complete search history.

(56) References Cited

U.S. PATENT DOCUMENTS

| | | | |
|---|---|---|---|
| 3,879,610 A | 4/1975 | Baker | |
| 6,094,365 A | 7/2000 | Chiao | |
| 6,229,721 B1 | 5/2001 | Mano et al. | |
| 2003/0090846 A1* | 5/2003 | Doi | 361/78 |
| 2004/0105692 A1 | 6/2004 | Tamiya et al. | |
| 2008/0181656 A1 | 7/2008 | Hamaya et al. | |

FOREIGN PATENT DOCUMENTS

| | | |
|---|---|---|
| JP | 01-261676 | 10/1989 |
| JP | 2006-214976 | 8/2006 |
| WO | 2009/080777 | 7/2009 |

OTHER PUBLICATIONS

Extended European Search Report issued Nov. 19, 2010 in EP Application No. 10168169.0.

* cited by examiner

*Primary Examiner* — Walter L Lindsay, Jr.
*Assistant Examiner* — Frederick Wenderoth
(74) *Attorney, Agent, or Firm* — Stanzione & Kim, LLP

(57) ABSTRACT

A constant current-type high-voltage power supply apparatus which is used in an image forming apparatus includes a leakage current detection unit that detects a leakage current leaked from at least one output terminal of the constant current-type high-voltage power supply apparatus and outputs the detected leakage current, a direct current voltage output unit that outputs different direct current (DC) voltages according to whether the leakage current detected by the leakage current detection unit is input, and a power control unit that controls power supply to the constant current-type high-voltage power supply apparatus according to the output DC voltage.

26 Claims, 5 Drawing Sheets

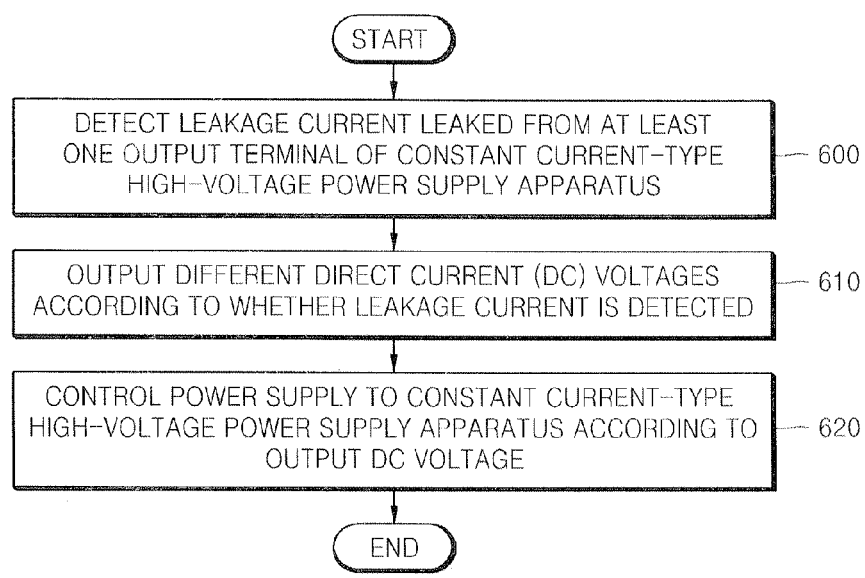
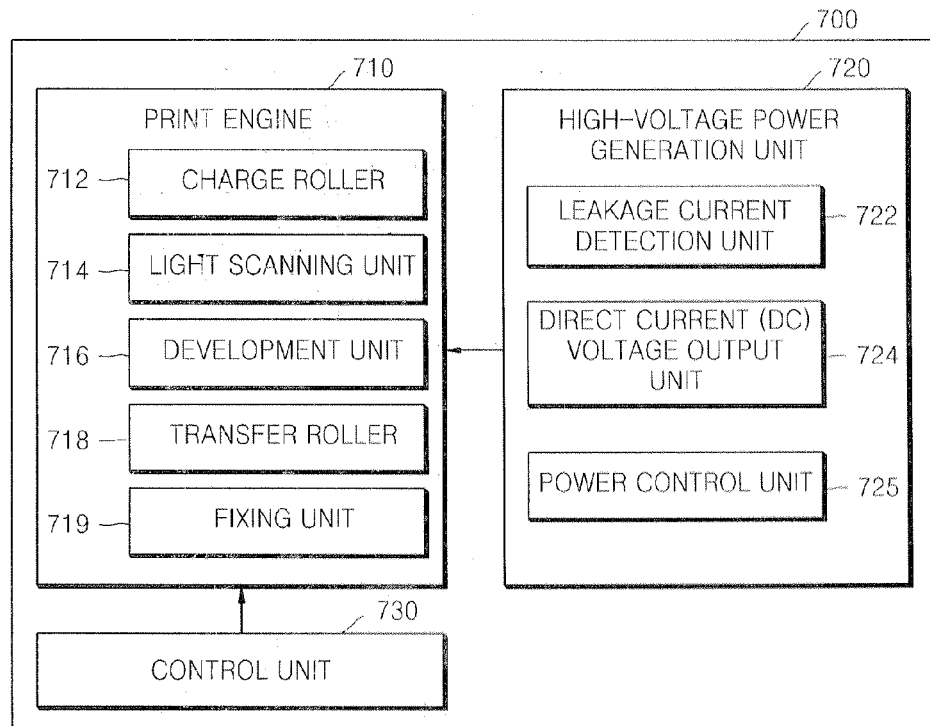

CONSTANT CURRENT-TYPE HIGH-VOLTAGE POWER SUPPLY APPARATUS AND METHOD OF CONTROLLING POWER OUTPUT FROM THE SAME

CROSS-REFERENCE TO RELATED APPLICATIONS

This application claims priority under 35 U.S.C. §119 from Korean Patent Application No. 10-2009-0075738, filed on Aug. 17, 2009, in the Korean Intellectual Property Office, the disclosure of which is incorporated herein in its entirety by reference.

BACKGROUND

1. Field of the Invention

The present general inventive concept relates to a constant current-type high-voltage power supply apparatus which is used in an image forming apparatus, and a method of controlling power supply to the constant current-type high-voltage power supply apparatus.

2. Description of the Related Art

In general, high-pressure power supply apparatuses are used in electronic devices requiring high-voltage direct current (DC) power, such as laser beam printers or fax machines. Examples of such high-pressure power supply apparatuses include a constant current-type high-voltage power supply apparatus that outputs a constant current. In regard to a constant current-type high-voltage power supply apparatus, when a contact between an output terminal of the high-pressure power supply apparatus and a load is unstable, an abnormal noise may temporally occur. For example, when the constant current-type high-voltage power supply apparatus is used in a laser printer, the output terminal of the high-pressure power supply apparatus is connected to rollers of the laser printer, such as a charge roller or a discharge roller, and provides a high-voltage to the rollers. In this case, since the output terminal physically contacts the outside of the rollers, the output terminal may unstably contact the rollers as the rollers rotate, and once the unstable contact occurs repeatedly, an abnormal noise may occur. In addition, the abnormal noise may cause abnormal operation of devices in the high-pressure power supply apparatus, thereby damaging components and devices attached to a high-pressure power supply apparatus circuit.

SUMMARY

The present general inventive concept provides a constant current-type high-voltage power supply apparatus which is used in an image forming apparatus, and a method of controlling power supply to the constant current-type high-voltage power supply apparatus.

Additional aspects and utilities of the present general inventive concept will be set forth in part in the description which follows and, in part, will be obvious from the description, or may be learned by practice of the general inventive concept.

Features and/or utilities of the present general inventive concept may be realized by a constant current-type high-voltage power supply apparatus which is used in an image forming apparatus. The constant current-type high-voltage power supply apparatus may include a leakage current detection unit that detects a leakage current leaked from at least one output terminal of the constant current-type high-voltage power supply apparatus and outputs the detected leakage current, a direct current (DC) voltage output unit that outputs different DC voltages according to whether the leakage current detected by the leakage current detection unit is input, and a power control unit that controls power supply to the constant current-type high-voltage power supply apparatus according to the output DC voltage.

Features and/or utilities of the present general inventive concept may also be realized by a method of controlling power supply to a constant current-type high-voltage power supply apparatus, in which the method includes detecting a leakage current leaked from at least one output terminal of the constant current-type high-voltage power supply apparatus, outputting different direct current (DC) voltages according to whether the leakage current is detected, and controlling power supply to the constant current-type high-voltage power supply apparatus according to the output DC voltage.

Features and/or utilities of the present general inventive concept may also be realized by a computer readable medium including a program to execute the method of controlling power supply to a constant current-type high-voltage power supply apparatus according to an embodiment of the present general inventive concept on a computer.

The present general inventive concept provides a method and apparatus of controlling power supplied to a coil performing induction heating in an image forming apparatus.

Features and/or utilities of the present general inventive concept may also be realized by a constant current-type high-voltage power supply apparatus including a power output unit to detect a leakage current at an output terminal of the constant current-type high-voltage power supply apparatus and to adjust the power level output from the output terminal based on the detected leakage current.

The power output unit may include a leakage current detection unit and a power control unit.

The power control unit may cause the constant current-type power supply apparatus to output a first power level when a leakage current is detected by the leakage current detection unit and to output a second power level when a leakage current is not detected by the leakage current detection unit.

The leakage current detection unit may detect the leakage current when the leakage current is above a predetermined threshold.

The first power level may be substantially zero.

Features and/or utilities of the present general inventive concept may also be realized by a method of controlling power output from a constant current-type power supply apparatus, the method including detecting a leakage current at an output of the constant current-type power supply apparatus and adjusting a power level output from the constant current-type power supply apparatus based on the detected leakage current.

Adjusting the power level output from the constant current-type power supply apparatus may include outputting substantially zero power when a leakage current is detected.

Adjusting the power level output from the constant current-type power supply apparatus may include generating a DC voltage based on a detected leakage current and generating the output power level based on the DC voltage.

Generating a DC voltage may include turning on a switch to output substantially zero voltage when a leakage current is detected and turning off the switch to output a DC voltage substantially greater than zero when no leakage current is detected.

Features and/or utilities of the present general inventive concept may also be realized by a computer-readable medium to store computer-readable code to control a computing device to perform a method of controlling power output from a constant current-type power supply apparatus, the method including detecting a leakage current at an output of the constant current-type power supply apparatus and adjusting a power level output from the constant current-type power supply apparatus based on the detected leakage current.

Features and/or utilities of the present general inventive concept may also be realized by an image forming apparatus including an image-forming engine to receive power from a constant current-type power source and to form an image, a control unit to control the image-forming engine to form an image, and a constant-current power generation unit to supply power to the image-forming engine.

The constant-current power generation unit may include a leakage current detection unit and a power control unit.

The power control unit may cause the constant current-type power supply apparatus to output a first power level when a leakage current is detected by the leakage current detection unit and to output a second power level when a leakage current is not detected by the leakage current detection unit.

BRIEF DESCRIPTION OF THE DRAWINGS

The above and other features and advantages of the present general inventive concept will become more apparent by describing in detail exemplary embodiments thereof with reference to the attached drawings in which:

FIG. 6 is a flowchart illustrating a method of controlling power supply to a constant current-type high-voltage power supply apparatus, according to an embodiment of the present general inventive concept; and FIG. 7 is a block diagram of an image forming apparatus in which a constant current-type high-voltage power supply apparatus is used, according to an embodiment of the present general inventive concept.

DETAILED DESCRIPTION OF THE EMBODIMENTS

Figure 1:
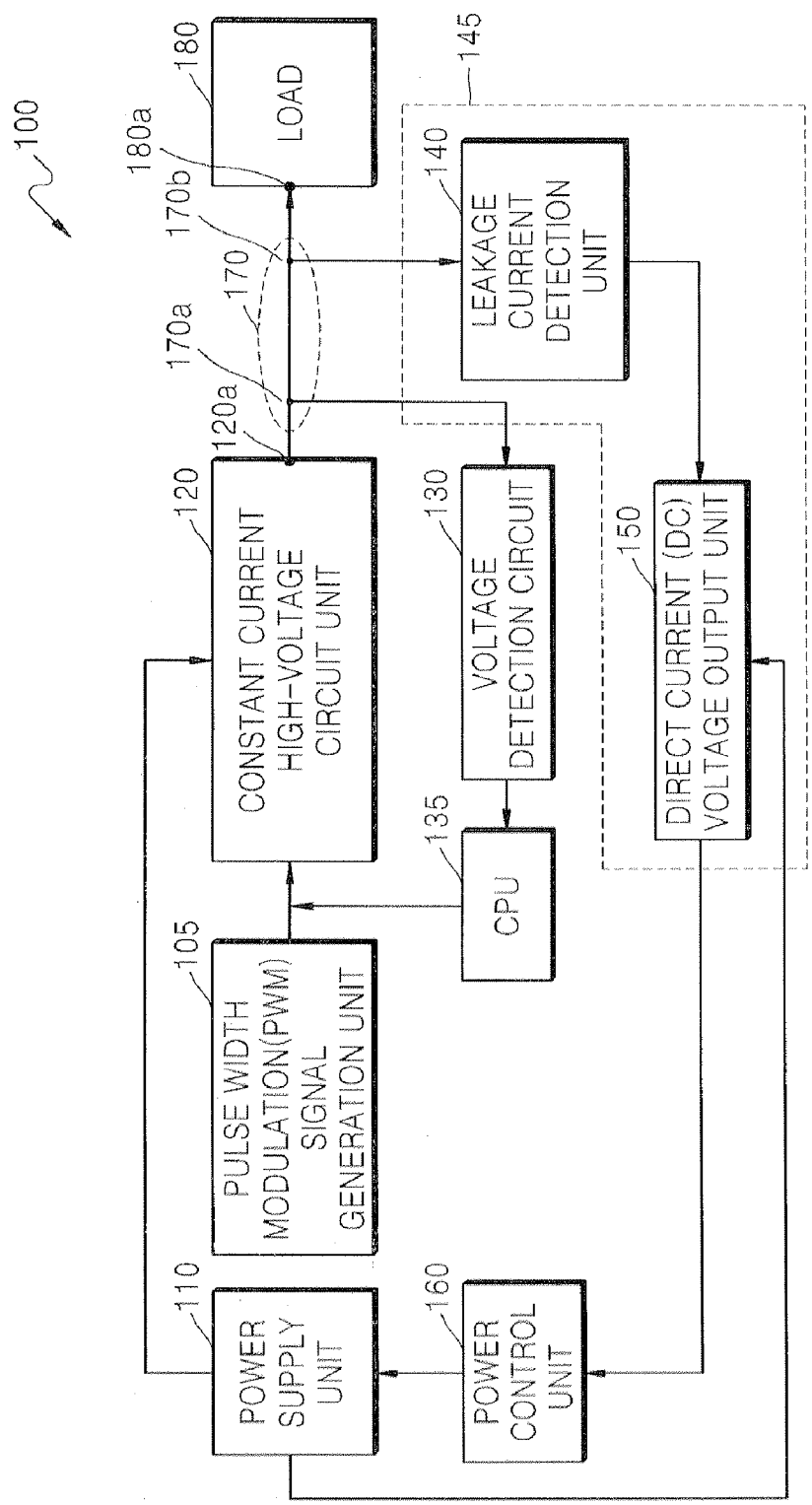
FIG. 1 is a block diagram of a constant current-type high-voltage power supply apparatus which is used in an image forming apparatus, according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of a constant current-type high-voltage power supply apparatus 100 which is used in an image forming apparatus, according to an embodiment of the present general inventive concept. The constant current-type high-voltage power supply apparatus 100 according to the present embodiment includes a pulse width modulation (PWM) signal generation unit 105, a power supply unit 110, a constant current high-voltage circuit unit 120, a voltage detection circuit 130, a central processing unit (CPU) 135, a leakage current detection unit 140, a direct current (DC) voltage output unit 150, and a power control unit 160.

The PWM signal generation unit 105 generates a PWM signal, and outputs the generated PWM signal to the constant current high-voltage circuit unit 120.

The power supply unit 110 supplies a power voltage of 24 V to the constant current high-voltage circuit unit 120.

The constant current high-voltage circuit unit 120 changes the power voltage of 24 V, which is supplied by the power supply unit 110, into a high-voltage by using the PWM signal input by the PWM signal generation unit 105, and outputs the high-voltage. For example, the constant current high-voltage circuit unit 120 converts the PWM signal into a DC level signal by using a low-pass filter, and outputs the DC level signal. In addition, the constant current high-voltage circuit unit 120 compares the output signal with a reference signal and outputs a control signal corresponding to a comparison result, and increases the power voltage of 24 V according to the output control signal, thereby converting the power voltage into a high-voltage. The converted high-voltage is rectified into a DC voltage, and then the rectified DC voltage is output to the output terminal 170 of the constant current high-voltage circuit unit 120 and supplied to a load 180. In addition, current output to the output terminal 170 of the constant current high-voltage circuit unit 120 is converted into a voltage, and then fed-back, so that a constant current is output to the output terminal 170.

The output terminal or node 170 may have one or more connection terminals to connect to the constant current high-voltage circuit unit 120, the voltage detection circuit 130, the leakage current detection unit 140, and the load 180. For example, a terminal 170a may be connected to a terminal 120a of the constant current high-voltage circuit unit 120 and to the voltage detection circuit 130. Another terminal 170b may be electrically connected to the terminal 170a and to a terminal 180a of the load 180.

During operation of the load 180, contact between the output terminal 170b and the load terminal 180a may be affected by movement or rotation of the load 180 or components of the load 180. Movement or rotation of the load 180 may cause current leakage that is detectable by the leakage current detection unit 140.

The voltage detection circuit 130 detects a maximum voltage which occurs when the output terminal 170 of the constant current high-voltage circuit unit 120 does not contact the load 180, and once the maximum voltage of the output terminal 170 is detected, the voltage detection circuit 130 inputs a signal for informing the maximum voltage detection to the CPU 135.

When the CPU 135 receives the signal for informing the maximum voltage detection from the voltage detection circuit 130, the CPU 135 grounds the PWM signal that is input to the constant current high-voltage circuit unit 120 from the PWM signal generation unit 105 and stops the driving of the constant current high-voltage circuit unit 120.

The leakage current detection unit 140 detects a leakage current that is leaked from the output terminal 170 of the constant current high-voltage circuit unit 120, and outputs the detected leakage current.

The DC voltage output unit 150 outputs different DC voltages to the power control unit 160 according to whether the leakage current detected by the leakage current detection unit 140 is input to the DC voltage output unit 150.

Figure 2:
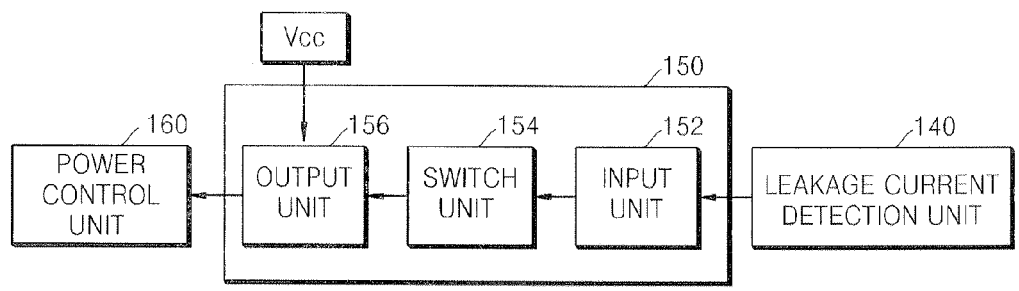
FIG. 2 is a detailed block diagram of a direct current (DC) voltage output unit according to an embodiment of the present general inventive concept.

FIG. 2 is a detailed block diagram of the DC voltage output unit 150, according to an embodiment of the present general inventive concept. Hereinafter, the operation of the DC voltage output unit 150 will be described in detail with reference to FIG. 2. Referring to FIG. 2, the DC voltage output unit 150 includes an input unit 152, a switch unit 154, and an output unit 156.

The leakage current detected by the leakage current detection unit 140 is input to the input unit 152.

The switch unit 154 performs on/off operations according to the input of the leakage current to the input unit 152. According to an embodiment of the present general inventive concept, when the input unit 152 receives the leakage current, the switch unit 154 is turned on, and when the input unit 152 does not receive the leakage current, the switch unit 154 is turned off.

The output unit 156 outputs different DC voltages according to whether the switch unit 154 is turned on or off. According to an embodiment of the present general inventive concept, the output unit 156 receives a power voltage Vcc from the power supply unit 110, and when the switch unit 154 is turned on, the output unit 156 outputs a first voltage to the power control unit 160, and when the switch unit 154 is turned off, the output unit 156 outputs a second voltage to the power control unit 160.

Figure 3:
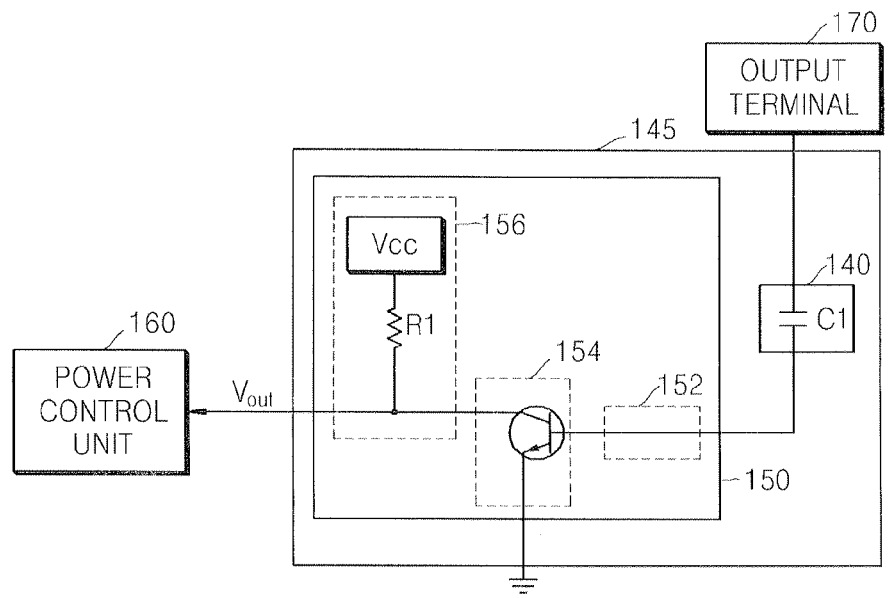
FIG. 3 is a diagram of a circuit structure of a leakage current detection/control unit including a leakage current detection unit and a DC voltage output unit, according to an embodiment of the present general inventive concept.

FIG. 3 is a diagram of a circuit structure of a leakage current detection/control unit 145 including the leakage current detection unit 140 and the DC voltage output unit 150, according to an embodiment of the present general inventive concept. Hereinafter, operations of the leakage current detection unit 140 and the DC voltage output unit 150 will be described in detail by referring to the circuit structure of the leakage current detection/control unit 145.

The leakage current detection unit 140 may include a capacitor C1 having a terminal connected to the output terminal 170 of the constant current-type high-voltage power supply apparatus 100 (see FIG. 1) and another terminal connected to the input unit 152 of the DC voltage output unit 150. Although, in the present embodiment, a capacitor is used to detect the leakage current, the present general inventive concept is not limited thereto. For example, the leakage current detection unit 140 may be any circuit or device capable of detecting an alternative current.

The capacitor C1 may have a capacitance in a range that is sufficient to detect a change of current at output terminal 170 or a leakage current from output terminal 170.

The switch unit 154 may include a transistor that includes a base connected to the input unit 152, a grounded emitter, and a collector connected to the output unit 156. Although a transistor is used as the switch unit 154 in the present embodiment, the switch unit 154 may be any circuit or device capable of being turned on/off according to the input of the leakage current.

The output unit 156 is connected to the collector of the switch unit 154, and a first resistor R1 is connected to the power voltage Vcc. The output unit 156 outputs different voltages according to whether the switch unit 154 is turned on or off.

Operations of the leakage current detection unit 140 and the DC voltage output unit 150 will now be described.

When a leakage current is input to the input unit 152 of the DC voltage output unit 150, a base-emitter voltage Vbe of 0.7 V or higher is formed between the base and emitter of the transistor of the switch unit 154 and thus the transistor electrically conducts. Thus, the collector of the transistor of the switch unit 154 is connected to the grounded emitter of the transistor, and the output unit 156 connected to the collector outputs 0 V as a first voltage. On the other hand, when a leakage current is not input to the input unit 152 of the DC voltage output unit 150, a voltage is not formed between the base and emitter of the transistor, and thus, the base-emitter voltage Vbe is 0 V and the transistor does not electrically conduct. Thus, the output unit 156 outputs the power voltage Vcc as a second voltage.

Figure 4:
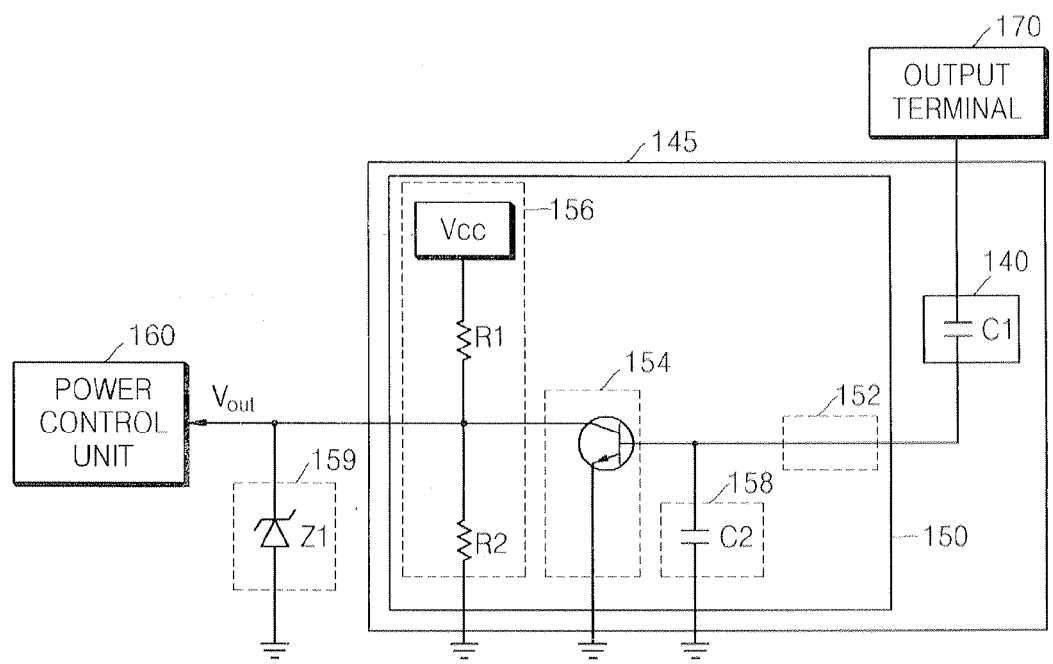
FIG. 4 is a diagram of a circuit structure of the leakage current detection/control unit including the leakage current detection unit and the DC voltage output unit, according to another embodiment of the present general inventive concept.

FIG. 4 is a diagram of a circuit structure of the leakage current detection/control unit 145 including the leakage current detection unit 140 and the DC voltage output unit 150, according to another embodiment of the present general inventive concept. The leakage current detection/control unit 145 of FIG. 4 according to the present embodiment is different from the leakage current detection/control unit 145 of FIG. 3 according to the previous embodiment in that the leakage current detection/control unit 145 according to the present embodiment further includes a timing control unit 158 connected to the input unit 152 and a Zener diode 159 connected to the output unit 156, and the output unit 156 further includes a second resistor R2.

Hereinafter, the structure and operation that are different from those of the leakage current detection/control unit 145 of FIG. 3 according to the previous embodiment will be described in detail.

The timing control unit 158 includes a capacitor C2 having a terminal connected to the input unit 152 and another terminal that is grounded. Since a capacitor, in general, charges with a voltage, the timing control unit 158 including the capacitor C2 stores the leakage current output by the leakage current detection unit 140, and delays the operation of the switch unit 154 such that the switch unit 154 is turned on/off at a point of time later than when the leakage current is input to input unit 152.

Capacitors C1 and C2 may have capacitances that are either the same or different, depending on the desired characteristics of the circuit.

In addition, since the Zener diode 159 includes a cathode connected to the DC voltage output unit 156 and the power control unit 160 and a grounded anode, the maximum voltage input to the power control unit 160 may be limited to a Zener voltage of the Zener diode 159. For example, if the Zener voltage of the Zener diode 159 is 3.3 V, even when a voltage of more than 3.3 V is input to the power control unit 160 due to an abnormal operation of the constant current-type high-voltage power supply apparatus 100, 3.3 V is input to the power control unit 160 by the Zener diode 159. Thus, malfunction of the constant current-type high-voltage power supply apparatus 100 caused by input of an abnormal voltage may be prevented.

In addition, in the output unit 156, the first resistor R1 having a terminal connected to the power voltage Vcc input to a constant current-type high-voltage power supply apparatus and the second resistor R2 having a terminal grounded are connected to each other in series, a terminal of the switch unit 154 is connected to a connection portion of the first resistor R1 and the second resistor R2, and different output voltages may be output to the connection portion according to whether the switch unit 154 is turned on or off.

For example, when a leakage current is input to the input unit 152 of the DC voltage output unit 150, a base-emitter voltage Vbe of 0.7 V or higher is formed between the base and emitter of the transistor of the switch unit 154 and thus the transistor of the switch unit 154 electrically conducts. Thus, the collector of the transistor of the switch unit 154 is connected to the grounded emitter, and the output unit 156 connected to the collector outputs 0 V as a first voltage. On the other hand, when a leakage current is not input to the input unit 152 of the DC voltage output unit 150, a voltage is not formed between the base and emitter of the transistor of the switch unit 154, and thus, the base-emitter voltage Vbe is 0 V and the transistor of the switch unit 154 does not electrically conduct. Thus, in the output unit 156, the power voltage Vcc is divided according to the resistance of the first and second resistors R1 and R2 connected in series. That is, the output unit 156 outputs a voltage obtained according to the following Equation as a second voltage: Vout=V cc*R1/(R1+R2). As described above, the output unit 156 outputs the first voltage or the second voltage according to whether the leakage current is detected.

Figure 5:
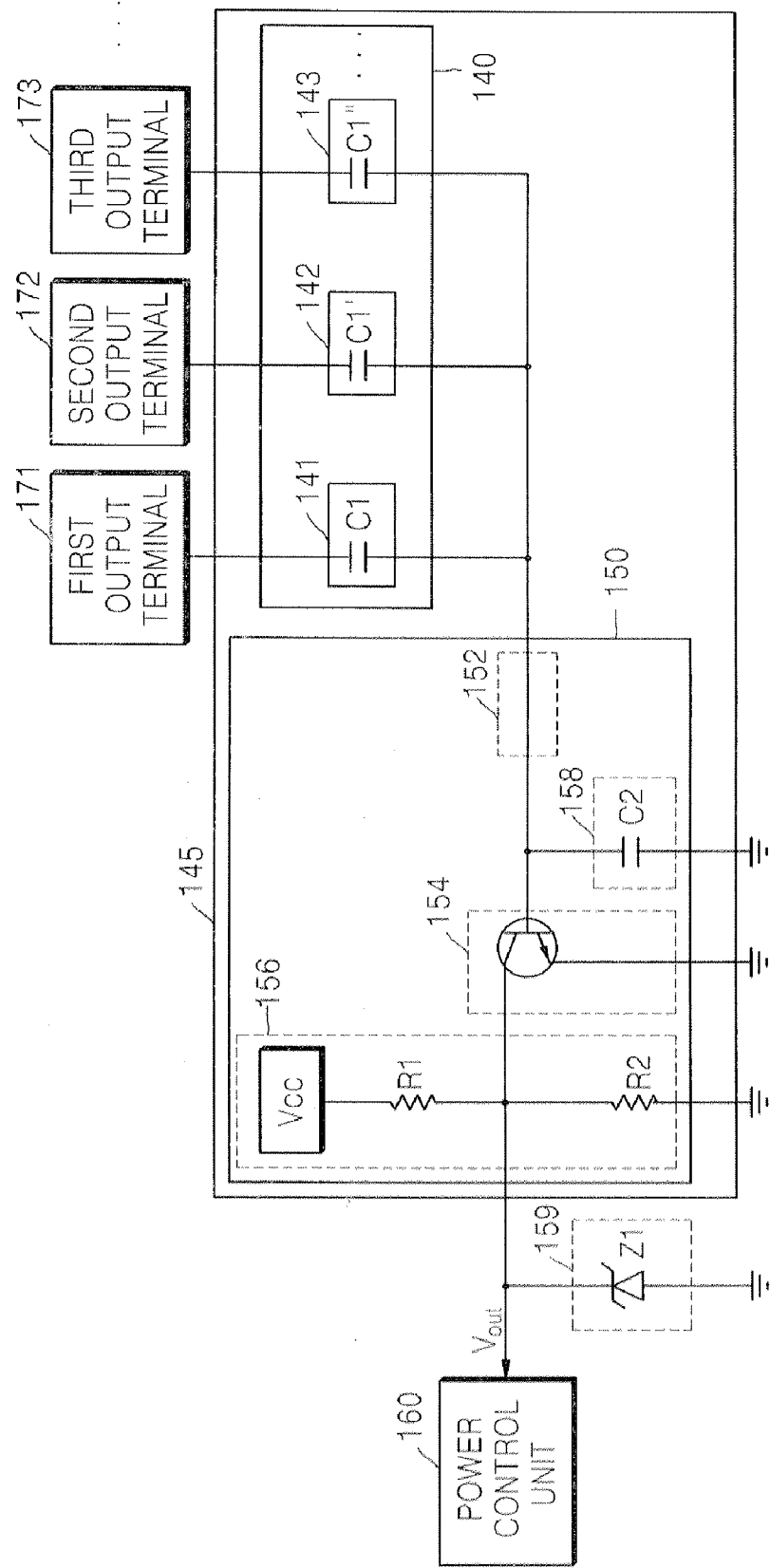
FIG. 5 is a diagram of a circuit structure of the leakage current detection/control unit including the leakage current detection unit and the DC voltage output unit, according to another embodiment of the present general inventive concept.

FIG. 5 is a diagram of a circuit structure of the leakage current detection/control unit 145 including the leakage current detection unit 140 and the DC voltage output unit 150, according to another embodiment of the present general inventive concept. Referring to FIG. 5, the leakage current detection/control unit 145 according to the present embodiment includes a plurality of leakage current detection units 141, 142, and 143 respectively corresponding to a plurality of output terminals 171, 172, and 173. Thus, the leakage current detection units 141, 142, and 143 respectively connected to the output terminals 171, 172, and 173 detect the leakage current leaked from the output terminals 171, 172, and 173, and the detected leakage current is input to the input unit 152 of the DC voltage output unit 150. When the leakage current is input to the input unit 152 by any one of the leakage current detection units 141, 142, and 143 of the leakage current detection unit 140, the switch unit 154 of the DC voltage output unit 150 is turned on. In the circuit structure of the leakage current detection/control unit 145 according to the present embodiment, the output terminals 171, 172, and 173 are provided and the number of output terminals 171, 172, and 173 corresponds to the number of leakage current detection units 141, 142, and 143. However, if the output terminals 171, 172, and 173 are commonly connected to a single leakage current detection unit, for example, the leakage current detection unit 141, only the leakage current detection unit 141 may detect a leakage current from the output terminals 171, 172, and 173. In addition, although three output terminals are illustrated in FIG. 5, the number of output terminals is not limited thereto.

Referring to FIG. 1, the power control unit 160 receives the first voltage or second voltage from the DC voltage output unit 150, and controls power supply according to the input voltage. When the leakage current detection unit 140 detects a leakage current and outputs the leakage current to the DC voltage output unit 150 and accordingly, the DC voltage output unit 150 outputs the first voltage to the power control unit 160, the power control unit 160 stops power supply to a constant current-type high-voltage power supply apparatus. As described above, when a leakage current occurs, the power control unit 160 stops power supply to the constant current-type high-voltage power supply apparatus 100 and thus prevents components or devices of the constant current-type high-voltage power supply apparatus 100 from being damaged due to the leakage current. In addition, as described in the embodiments with reference to FIGS. 4 and 5 in which the Zener diode 159 is used, the inputting of a Zener voltage to the power control unit 160 means the occurrence of an abnormal voltage in the constant current-type high-voltage power supply apparatus 100. Thus, the power control unit 160 stops power supply to the constant current-type high-voltage power supply apparatus 100 and prevents components or devices of the constant current-type high-voltage power supply apparatus 100 from being damaged due to the abnormal voltage.

FIG. 6 is a flowchart illustrating a method of controlling power supply to a constant current-type high-voltage power supply apparatus, according to an embodiment of the present general inventive concept.

Hereinafter, the method of controlling power supply to a constant current-type high-voltage power supply apparatus, according to the present embodiment, will be described by referring to the constant current-type high-voltage power supply apparatuses 100 described with reference to FIGS. 1 to 5.

In operation 600, a leakage current leaked from at least one output terminal of the constant current-type high-voltage power supply apparatus is detected. At least one leakage current detection unit of the constant current-type high-voltage power supply apparatus detects a leakage current leaked from at least one output terminal of the constant current-type high-voltage power supply apparatus. The number of leakage current detection units may be one or the same as the number of output terminals.

In operation 610, different DC voltages are output according to whether a leakage current is detected. According to the method of controlling power supply to a constant current-type high-voltage power supply apparatus according to the present embodiment, different DC voltages are output according to whether a leakage current is detected at any one output terminal of the at least one output terminal. According to an embodiment of the present general inventive concept, when a leakage current is detected, a voltage of 0 V is output as a first voltage. On the other hand, when a leakage current is not detected, a power voltage Vcc or a voltage obtained by voltage division according to resistor division is output as a second voltage. However, the output DC voltage may vary according to the circuit structure, and thus, is not limited thereto.

In operation 620, power supply to the constant current-type high-voltage power supply apparatus is controlled according to the output DC voltage. If a leakage current is detected at the at least one output terminal and accordingly, the first voltage is output, the power supply to the constant current-type high-voltage power supply apparatus is stopped. As described above, when a leakage current is detected at an output terminal of a constant current-type high-voltage power supply apparatus, power supply to the constant current-type high-voltage power supply apparatus is stopped and thus, components or devices of the constant current-type high-voltage power supply apparatus are protected from being damaged due to the leakage current.

FIG. 7 is a block diagram of an image forming apparatus 700 in which a constant current-type high-voltage power supply apparatus is used, according to an embodiment of the present general inventive concept. Referring to FIG. 7, the image forming apparatus 700 in which the constant current-type high-voltage power supply apparatus is used includes a print engine 710, a high-voltage power generation unit 720, and a control unit 730.

The print engine 710 forms an image on a print medium by performing a print process including charging, exposing, developing, transferring, and fixing operations. The print engine 710 includes a charge roller 712 that charges a photosensitive drum, a light scanning unit 714 that scans light corresponding to print data on the photosensitive drum of the charge roller 712, a development unit 716 that includes a development roller and a supply roller and develops an electrostatic latent image, which is formed on the photosensitive drum by the light scanning unit 714, by using a developer such as toner, a transfer roller 718 that transfers the developed image on the photosensitive drum onto a record medium, and a fixing unit 719 that includes a fixing roller and a pressing roller and fixes the toner image transferred onto the record medium under high temperature and pressure. In addition, the print engine 710 performs a printing process including charging, exposing, developing, transferring, and fixing operations by using the charge roller 712, the light scanning unit 714, the development unit 716, the transfer roller 718, and the fixing unit 719 in order to form an image on the print medium.

The print engine 710 may correspond to the load 180 of FIG. 1 and the constant current-type high-voltage power supply apparatus 100 of FIG. 1 may correspond to the high-voltage power generation unit 720 of FIG. 7.

The high-voltage power generation unit 720 applies a high-voltage to at least one unit of the print engine 710 which performs the printing process. According to an embodiment of the present general inventive concept, the high-voltage power generation unit 720 that constitutes a constant current-type high-voltage power supply apparatus, applies a high-voltage to at least one selected from the group consisting of the charge roller 712, the light scanning unit 714, the development unit 716, the transfer roller 718, and the fixing unit 719, and drives the print engine 710 to perform the printing process and accordingly, forms an image on the print medium. In addition, the high-voltage power generation unit 720 includes a leakage current detection unit 722 that detects a leakage current leaked from at least one output terminal of the high-voltage power generation unit 720 and outputs the detected leakage current, a DC voltage output unit 724 that outputs different DC voltages according to input of the leakage current detected by the leakage current detection unit, and a power control unit 725 that controls power supply to the high-voltage power generation unit 720 according to the output DC voltage, and thus when there is a leakage current at the output terminal through which a high-voltage is supplied to the print engine 710, power supply to the high-voltage power generation unit 720 is stopped, and thus, components or devices of the high-voltage power generation unit 720 are protected from being damaged due to the leakage current.

The control unit 730 controls operation of the print engine 710 so that the print engine 710 performs the printing process smoothly.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit data via carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present invention have been shown and described, it would be appreciated by those skilled in the art that changes may be made in these embodiments without departing from the principles and spirit of the general inventive concept, the scope of which is defined in the claims and their equivalents.

What is claimed is:

1. A constant current-type high-voltage power supply apparatus to supply constant current to an image forming apparatus, the constant current-type high-voltage power supply apparatus comprising:
    a leakage current detection unit to detect a leakage current leaked from at least one output terminal of the constant current-type high-voltage power supply apparatus and to output the detected leakage current;
    a direct current (DC) voltage output unit to output different DC voltages according to whether the leakage current detected by the leakage current detection unit is received as an input; and
    a power control unit to control power output from the constant current-type high-voltage power supply apparatus according to the DC voltage received from the DC voltage output unit.

2. The constant current-type high-voltage power supply apparatus of claim 1, wherein the DC voltage output unit comprises:
    an input unit to receive the detected leakage current from the leakage current detection unit;
    a switch unit that is turned on/off according to the leakage current received by the input unit; and
    an output unit to output the different DC voltages according to whether the switch unit is turned on or off.

3. The constant current-type high-voltage power supply apparatus of claim 2, wherein the DC voltage output unit further comprises a timing control unit to delay operation of the switch unit to turn on/off at a point of time later than when the leakage current is input to input unit.

4. The constant current-type high-voltage power supply apparatus of claim 2, wherein the switch unit is turned on when the detected leakage current is input to the input unit, and the switch unit is turned off when the detected leakage current is not input to the input unit, and
    the output unit outputs a first voltage when the switch unit is turned on, and
    the output unit outputs a second voltage when the switch unit is turned off.

5. The constant current-type high-voltage power supply apparatus of claim 2, wherein the switch unit comprises a transistor comprising:
    a base that is connected to the input unit,
    an emitter that is grounded, and
    a collector connected to the output unit.

6. The constant current-type high-voltage power supply apparatus of claim 2, wherein the output unit comprises a first resistor having a first terminal connected to a power source and a second resistor having a first grounded terminal, wherein the first resistor and second resistor are connected to each other in series, and a second connection terminal of each of the first and second resistors is connected to a same terminal of the switch unit and outputs the different output voltages.

7. The constant current-type high-voltage power supply apparatus of claim 3, wherein the timing control unit comprises a capacitor having a terminal that is connected to the input unit, and another terminal that is grounded.

8. The constant current-type high-voltage power supply apparatus of claim 4, wherein when the first voltage is input, the power control unit stops power output from the constant current-type high-voltage power supply apparatus.

9. The constant current-type high-voltage power supply apparatus of claim 3, further comprising a Zener diode comprising a cathode connected to the power control unit and a grounded anode,
wherein the Zener diode limits a maximum voltage input to the power control unit to a Zener voltage of the Zener diode.

10. The constant current-type high-voltage power supply apparatus of claim 1, wherein the leakage current detection unit includes a plurality of leakage current detection units, and
the number of the leakage current detection units is the same as the number of the at least one output terminal.

11. The constant current-type high-voltage power supply apparatus of claim 1, wherein the leakage current detection unit comprises a capacitor having a terminal that is connected to the at least one output terminal of the constant current-type high-voltage power supply apparatus, and another terminal that is connected to the direct current voltage output unit.

12. A method of controlling power output from a constant current-type high-voltage power supply apparatus, the method comprising:
detecting a leakage current leaked from at least one output terminal of the constant current-type high-voltage power supply apparatus;
outputting different direct current (DC) voltages according to whether the leakage current is detected; and
controlling power output from the constant current-type high-voltage power supply apparatus according to the output DC voltage.

13. The method of claim 12, wherein, when the leakage current is detected at any one output terminal of the at least one output terminal of the constant current-type high-voltage power supply apparatus, a first DC voltage is output, and when the leakage current is not detected, a second DC voltage is output.

14. The method of claim 13, wherein, power supply to the constant current-type high-voltage power supply apparatus is stopped if the first voltage is output.

15. A computer readable medium comprising computer-readable codes stored thereon as a program to execute a method of controlling power output from a constant current-type high-voltage power supply apparatus, the method comprising:
detecting a leakage current leaked from at least one output terminal of the constant current-type high-voltage power supply apparatus;
outputting different direct current (DC) voltages according to whether the leakage current is detected; and
controlling power output from the constant current-type high-voltage power supply apparatus according to the output DC voltage.

16. An image forming apparatus comprising:
a print engine that forms an image on a print medium by performing a print process including charging, exposing, developing, transferring, and fixing operations; and
a high-voltage power generation unit that applies a high-voltage to at least one unit of the print engine which performs the printing process; and
a control unit that controls operation of the print engine, wherein the high-voltage power generation unit comprises:
a leakage current detection unit to detect a leakage current leaked from at least one output terminal of the high-voltage power generation unit and to output the detected leakage current;
a direct current (DC) voltage output unit to output different DC voltages according to whether the leakage current detected by the leakage current detection unit is received as an input; and
a power control unit to control power output from the high-voltage power generation unit according to the output DC voltage.

17. A constant current-type power supply apparatus, comprising:
a power output unit to detect a leakage current at an output terminal of the constant current-type high-voltage power supply apparatus and to adjust the power level output from the output terminal based on the detected leakage current.

18. The constant current-type power supply apparatus according to claim 17, wherein the power output unit comprises:
a leakage current detection unit; and
a power control unit,
wherein the power control unit causes the constant current-type power supply apparatus to output a first power level when a leakage current is detected by the leakage current detection unit and to output a second power level when a leakage current is not detected by the leakage current detection unit.

19. The constant current-type power supply apparatus according to claim 18, wherein the leakage current detection unit detects the leakage current when the leakage current is above a predetermined threshold.

20. The constant current-type power supply apparatus according to claim 18, wherein the first power level is substantially zero.

21. A method of controlling power output from a constant current-type power supply apparatus, the method comprising:
detecting a leakage current at an output of the constant current-type power supply apparatus; and
adjusting a power level output from the constant current-type power supply apparatus based on the detected leakage current.

22. The method according to claim 21, wherein adjusting the power level output from the constant current-type power supply apparatus comprises outputting substantially zero power when a leakage current is detected.

23. The method according to claim 21, wherein adjusting the power level output from the constant current-type power supply apparatus comprises:
generating a DC voltage based on a detected leakage current; and
generating the output power level based on the DC voltage.

24. The method according to claim 23, wherein generating a DC voltage comprises:
turning on a switch to output substantially zero voltage when a leakage current is detected; and
turning off the switch to output a DC voltage substantially greater than zero when no leakage current is detected.

25. An image forming apparatus, comprising:
an image-forming engine to receive power from a constant current-type power source and to form an image;
a control unit to control the image-forming engine to form an image; and
a constant-current power generation unit to supply power to the image-forming engine, the constant-current power generation unit comprising:
a leakage current detection unit; and
a power control unit, wherein the power control unit causes the constant current-type power supply apparatus to output a first power level when a leakage current is detected by the leakage current detection unit and to output a second power level when a leakage current is not detected by the leakage current detection unit.

26. An image-forming apparatus, comprising:
a print engine having a movable element to form an image; and
a constant current output unit to generate power to the movable element of the print engine,
wherein the constant current output unit detects a leakage current at an output of the constant current-type power supply apparatus and adjusts a power level output from the constant current-type power supply apparatus based on the detected leakage current.

* * * * *